(12) United States Patent
Kumar et al.

(10) Patent No.: US 9,444,677 B2
(45) Date of Patent: Sep. 13, 2016

(54) SCALABLE EDGE NODE PROTECTION USING IPV6 SEGMENT ROUTING EXTENSION HEADER

(71) Applicant: Cisco Technology, Inc., San Jose, CA (US)

(72) Inventors: Nagendra Kumar, Durham, NC (US); Carlos M. Pignataro, Raleigh, NC (US); Clarence Filsfils, Brussels (BE); Pierre Jean Rene Francois, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 151 days.

(21) Appl. No.: 14/155,409

(22) Filed: Jan. 15, 2014

(65) Prior Publication Data
US 2015/0109902 A1 Apr. 23, 2015

Related U.S. Application Data

(60) Provisional application No. 61/892,635, filed on Oct. 18, 2013.

(51) Int. Cl.
| | |
|---|---|
| *H04L 12/24* | (2006.01) |
| *H04L 12/723* | (2013.01) |
| *H04L 12/703* | (2013.01) |
| *H04L 12/707* | (2013.01) |
| *H04L 12/721* | (2013.01) |

(52) U.S. Cl.
CPC ........ *H04L 41/0668* (2013.01); *H04L 41/0659* (2013.01); *H04L 45/22* (2013.01); *H04L 45/28* (2013.01); *H04L 45/50* (2013.01); *H04L 45/34* (2013.01); *H04L 45/507* (2013.01)

(58) Field of Classification Search
CPC ... H04L 41/0668; H04L 45/28; H04L 45/50; H04L 45/507; H04L 45/304; H04L 12/5689; H04L 12/509; H04L 12/4654; H04L 12/4658
See application file for complete search history.

(56) References Cited

U.S. PATENT DOCUMENTS

| | | | |
|---|---|---|---|
| 7,345,991 B1* | 3/2008 | Shabtay | H04L 12/2863 370/221 |
| 8,094,575 B1* | 1/2012 | Vadlakonda | H04L 45/123 370/252 |

(Continued)

OTHER PUBLICATIONS

Filsfils et al., "Segment Routing Use Cases", Network Working Group, Jun. 28, 2013, <draft-filsfils-rtgwg-segment-routing-use-cases-00>, XP015094843, pp. 1-44.

(Continued)

*Primary Examiner* — Warner Wong
(74) *Attorney, Agent, or Firm* — Leon R. Turkevich

(57) ABSTRACT

In one embodiment, a method comprises selecting, by an ingress provider edge router, one of first or second provider edge routers as a primary router for reaching a destination via a core network, and selecting the other of the first or second provider edge routers as a backup router for reaching the destination via the core network; and inserting, into an IPv6 data packet destined for the destination, a primary label assigned by the primary router and a repair label assigned by backup router, and an IPv6 extension header specifying first and second segment identifiers associated with the respective first and second provider edge routers and a protected flag that enables fast rerouting of the IPv6 data packet to the backup router if the primary router is unavailable.

20 Claims, 7 Drawing Sheets

(56) References Cited

U.S. PATENT DOCUMENTS

| | | | | |
|---|---|---|---|---|
| 8,259,564 | B1* | 9/2012 | Gredler et al. | G06F 11/2005 370/218 |
| 8,953,432 | B2* | 2/2015 | Ansari | H04L 45/02 370/216 |
| 2006/0268682 | A1 | 11/2006 | Vasseur | |
| 2007/0091794 | A1* | 4/2007 | Filsfils et al. | H04L 12/66 370/228 |
| 2007/0091795 | A1* | 4/2007 | Bonaventure et al. | H04L 45/04 370/228 |
| 2007/0091796 | A1* | 4/2007 | Filsfils et al. | H04L 45/00 370/228 |
| 2008/0062891 | A1* | 3/2008 | Van der Merwe et al. | H04L 45/04 370/254 |
| 2010/0008220 | A1 | 1/2010 | Le Roux | |
| 2011/0002301 | A1* | 1/2011 | Chan et al. | H04W 40/36 370/331 |
| 2011/0286326 | A1 | 11/2011 | Awano | |
| 2012/0092986 | A1* | 4/2012 | Chen | H04L 45/22 370/228 |
| 2015/0092785 | A1* | 4/2015 | Torvi | 370/401 |
| 2015/0207724 | A1* | 7/2015 | Choudhury | H04L 45/026 370/255 |

OTHER PUBLICATIONS

Previdi, Ed., et al., "IS-IS Extensions for Segment Routing" <draft-previdi-isis-segment-routing-extensions-01>, IS-IS for IP Internets, Internet-Draft, Jul. 1, 2013, pp. 1-26.

Bashandy et al., U.S. Appl. No. 13/935,639, filed Jul. 5, 2013.

Bashandy et al., "BGP FRR Protection against Edge Node Failure Using Table Mirroring with Context Labels", Network Working Group, Internet Draft, <draft-bashandy-bgp-frr-mirror-table-00.txt>, Oct. 8, 2012, pp. 1-25.

Bashandy et al., "BGP FRR Protection against Edge Node Failure Using Vector Labels", Network Working Group, Internet Draft, <draft-bashandy-bgp-frr-vector-label-00.txt>, Jul. 7, 2012, 32 pages.

Filsfils et al., "Segment Routing Architecture", Network Working Group, Internet Draft, [online], Jun. 28, 2013, [retrieved on Sep. 26, 2013]. Retrieved from the Internet: URL: <http://tools.ietf.org/html/draft-filsfils-rtgwg-segment-routing-00>, pp. 1-28.

Cisco, "Segment Routing CCO Presentation", [online], 2010, [retrieved on Sep. 26, 2013]. [Retrieved from the Internet: URL: <http://www.slideshare.net/getyourbuildon/segment-routing-network-enablement-for-application>, 32 slides.

Francois et al., "Segment Routing Fast Reroute", Network Working Group, Jul. 1, 2013, <draft-francois-sr-frr-00>, XP015094793, pp. 1-12.

Bryant et al., "Remote LFA FRR", Network Working Group, May 23, 2013, <draft-ietf-rtgwg-remote-lfa-02>, XP015090907, pp. 1-15.

Filsfils et al., "Segment Routing Architecture", Network Working Group, Jun. 28, 2013, <draft-filsfils-rtgwg-segment-routing-00>, XP015094844, pp. 1-28.

Filsfils et al., U.S. Appl. No. 14/078,219, filed Nov. 12, 2013.

Bashandy et al., U.S. Appl. No. 13/935,649, filed Jul. 5, 2013.

* cited by examiner

SCALABLE EDGE NODE PROTECTION USING IPV6 SEGMENT ROUTING EXTENSION HEADER

This application claims priority to U.S. Provisional Application No. 61/892,635, filed Oct. 18, 2013.

TECHNICAL FIELD

The present disclosure generally relates to recovery from failure of edge routers that utilize border gateway protocol (BGP) for tunneling data traffic across a BGP-free core network that utilizes segment routing.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Wide area networks are composed of edge routers that provide connections for a multi-homed network to a destination network via a core network, also referred to as a backbone network. Since the core network must be composed of core routers that must be able to perform the fastest possible switching operations for extremely large amounts of data traffic, the core routers often are implemented using BGP-free core routers: unlike edge routers that utilize BGP for tunneling data traffic across a core network to destination networks, BGP-free core routers do not employ BGP protocol and therefore do not need to learn about the millions of Internet protocol (IP) address prefixes that may be utilized by the edge routers.

However, if an edge router encounters a failure, there is a need to restore traffic within a guaranteed fifty (50) millisecond interval by retunnelling packets to another edge router that advertised the destination IP address prefix, without the necessity of BGP reconvergence by the edge routers.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
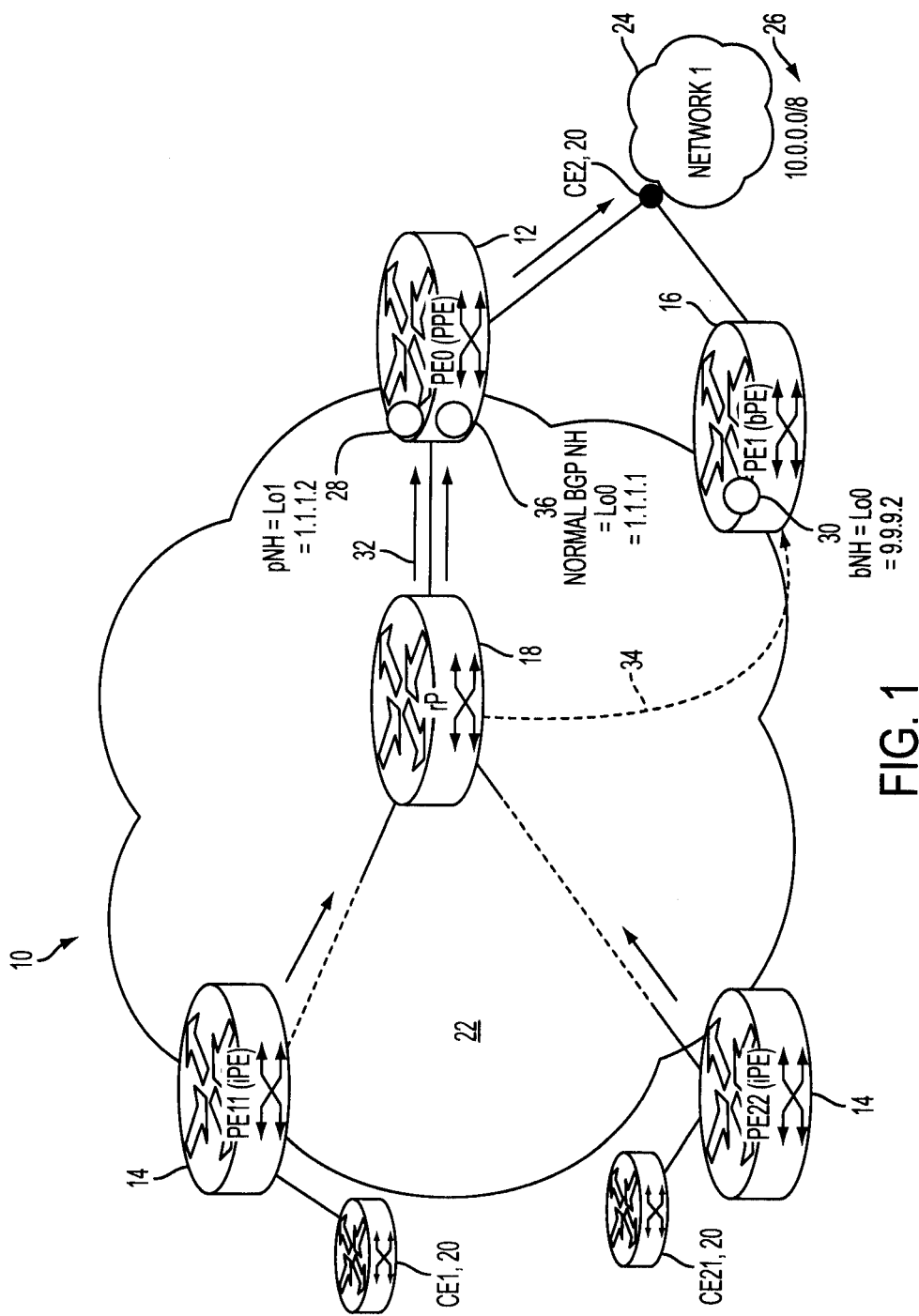
FIG. 1 illustrates an example system having BGP-enabled egress routers for sending labels for reaching a destination and repair information via BGP-free core router in a core network, enabling fast rerouting of a data packet by the core router using IPv6 extension headers, according to an example embodiment.

In one embodiment, a method comprises generating, by a first provider edge router associated with a first segment identifier, a primary label for reaching a destination, and a repair label for reaching the destination if a second provider edge router associated with a second segment identifier is unavailable to reach the destination; advertising, by the first provider edge router, the first segment identifier; and sending via a core network, by the provider edge router, an advertisement specifying the primary and repair labels, enabling an ingress provider edge router to insert, into an IPv6 data packet, selected primary and repair labels from the first and second provider edge routers and an IPv6 extension header specifying the first and second segment identifiers and a backup flag, for fast rerouting to the destination via one of the first or second provider edge router if the other is unavailable.

In another embodiment, a method comprises selecting, by an ingress provider edge router, one of first or second provider edge routers as a primary router for reaching a destination via a core network, and selecting the other of the first or second provider edge routers as a backup router for reaching the destination via the core network; and inserting, into an IPv6 data packet destined for the destination, a primary label assigned by the primary router and a repair label assigned by backup router, and an IPv6 extension header specifying first and second segment identifiers associated with the respective first and second provider edge routers and a protected flag that enables fast rerouting of the IPv6 data packet to the backup router if the primary router is unavailable.

In yet another embodiment, a method comprises a core router in a core network receiving an IPv6 data packet generated by an ingress provider edge router and destined for a destination via a primary egress router, the IPv6 data packet having a segment routing-typed IPv6 extension header specifying a segment identifier for the primary egress router and backup flag for fast rerouting of the IPv6 data packet to the destination via a backup egress router if the primary egress router is unavailable; and the core router fast rerouting the IPv6 data packet to the backup egress router in response to determining the primary egress router is unavailable and detecting the backup flag, the fast rerouting including obtaining the corresponding segment identifier for the backup egress router from the segment routing-typed IPv6 extension header, inserting the segment identifier for the backup egress router into a destination address field of an outer IPv6 header of the IPv6 data packet, and outputting the IPv6 data packet toward the backup egress router.

DETAILED DESCRIPTION

Particular embodiments enable any core router in a BGP-free core network to serve as a repairing core router (rP) providing connectivity between provider edge routers (PEs)

that utilize BGP to tunnel traffic across the BGP-free core network. The particular embodiments also use Segment Routing (SR), described below, thereby eliminating the necessity of hop-by-hop signaling techniques, such as Resource Reservation Protocol—Traffic Engineering (RSVP-TE) (as described for example in RFC 3209, etc.) or Label Distribution Protocol (LDP) (as defined for example in RFC 5036). Ingress PE routers can encapsulate a received data packet (e.g., an IPv4 or IPv6 data packet, a layer 2 packet, etc.) with an SR-typed IPv6 outer header and an SR-typed extension header specifying at least the segment identifiers of a primary egress router and a backup egress router. The particular embodiments also enable a repairing core router to execute a fast reroute of a data packet to a destination via a backup egress router, in response to detecting a backup flag associated with a primary egress router that is unavailable, based solely on obtaining the corresponding segment identifier for the backup egress router from the SR-typed IPv6 extension header in the received data packet.

FIG. 1 is a diagram illustrating an example network 10 having one or more protected Provider Edge (pPE) routers 12, one or more ingress Provider Edge (iPE) routers 14, one or more repair Provider Edge (rPE) routers 16, and one or more BGP-free core network routers 18 serving as repair routers (rP), according to an example embodiment. The repair Provider Edge (rPE) routers 16 also are referred to herein as "backup provider edge routers" (bPE) to reduce confusion with the repair routers (rP) 18. The BGP-free core network router 18 serves as a repairing core router that reroutes data traffic to a backup provider edge (rPE) router 16 if a protected Provider Edge (pPE) router 12 is unavailable. The BGP-free core network router 18 is part of a BGP-free core network 22 that does not utilize BGP protocol, but serves as a "backbone" network for edge routers 12, 14, and 16 that tunnel traffic to each other using the core network 22.

The provider edge routers 12, 14, and 16 serve as next-hop routers into and out of the core network 22 for customer edge (CE) routers 20: each customer edge (CE) router 20 can be positioned at the edge of an associated external network 24 having one or more globally-distinct IPv4 and/or IPv6 address prefixes 26. Each external network 24 is a distinct Autonomous System (AS).

Hence, ingress provider edge (iPE) routers 14 can tunnel data traffic via the core network 22 based on inserting ("pushing") context-sensitive labels into each data packet: the context-sensitive labels, generated by the egress routers 12 and 16, can be implemented based on applying IPv6 based segment routing to multiprotocol label switching (MPLS). The egress provider edge routers 12, 16 can output context-sensitive labels for reaching destination address prefixes 26 according to BGP. For example, the PE router "PE0" 12 can generate a corresponding primary label (pL1) (54 of FIG. 5) for reaching the destination "CE2" 20 serving the address prefix "10.0.0.0/8" 26, and the PE router "PE1" 16 can generate a corresponding primary label (pL2) for reaching the destination "CE2" 20.

Each egress router 12 and 16 also can advertise reachability to the destination "CE2" using a backup label (i.e., repair label) (56 of FIG. 5) for backup routing. For example, the PE router "PE0" 12 can generate a corresponding repair label (rL1) (56 of FIG. 5) for reaching the destination "CE2" 20 serving the address prefix "10.0.0.0/8" 26 if another router is unavailable, and the PE router "PE1" 16 can generate a corresponding repair label (rL2) for reaching the destination "CE2" 20 if another router is unavailable.

Each egress router 12 or 16 can output an advertisement message advertising reachability to the destination "CE2" via a next hop address using assigned primary or repair labels: for example, the egress router 12 can advertise reachability to "CE2" 20 via a corresponding next hop address (e.g., pNH=1.1.1.2) 28 using the primary label "pL1" 54 or the repair label "rL1" 56 assigned by the egress router 12 (illustrated in FIG. 5); the egress router 16 can advertise reachability to "CE2" 20 via a corresponding next hop address (e.g., bNH=9.9.9.2) 30 using the primary label "pL2" 54 or the repair label "rL2" assigned by the egress router 16. The egress routers 12 and 16 can output the advertisement messages as BGP Next Hop (NH) update messages (illustrated in FIG. 5), for example VPN update messages. The advertisement messages enable ingress PE routers 14 to create reachability tables for reaching the destination "CE2" 20 via any one of the egress routers 12 or 16, using the specified labels and segment identifiers associated with the egress routers.

Segment Routing (SR) enables any network node (server device, PE device, Aggregation device, core router device, etc.) to select any explicit path for each of its traffic classes. As described previously, the explicit path according to segment routing does not rely on a hop-by-hop signaling technique such as LDP or RSVP. Segment routing relies only on a set of "segments" that are advertised by the link-state routing protocol (e.g., IS-IS, OSPF) deployed in the network 10. Segments act as topological sub-paths that can be combined together to form the desired explicit path. There are two forms of segments: nodal and adjacency segments. A nodal segment represents a shortest path to a node in an interior gateway protocol (IGP) topology. An adjacency segment represents a specific adjacency to a node. A nodal segment is typically a multi-hop path while an adjacency segment is a one-hop path. Hence, each provider edge router 12, 14, 16 can have an associated segment identifier, e.g., a nodal segment identifier or an adjacency segment identifier.

Hence, the control plane of segment routing can be applied to the MPLS dataplane: a nodal segment to node N is instantiated in the MPLS dataplane as an LSP along the shortest path to the node. An adjacency segment is instantiated in the MPLS dataplane as a crossconnect entry pointing to a specific egress datalink.

As described below with respect to FIGS. 3-7, the egress routers 12 and 16 also can output advertisement messages as link state messages (illustrated in FIG. 4) identifying the segment identifiers associated with the egress routers, enabling routers in the core network 22 to reach the egress routers 12 and 16 via their respective segment identifiers. As described below, a core router 18 can execute fast rerouting based on obtaining, from an IPv6 extension header in a received IPv6 data packet, the segment identifier for a backup router in response to detecting a protected flag indicating the presence of the segment identifier for the backup router if a primary egress router is unavailable.

Hence, labels advertised by the egress PE routers 12 and 16, and the respective segment identifiers associated with the egress PE routers 12 and 16 enable the ingress Provider Edge routers (iPE) (e.g., PE11 and/or PE22) 14 to insert primary and repair labels and IPv6 segment routing-typed headers, enabling any core router (e.g., the repair PE router (rPE) 16) to execute fast rerouting to the destination "CE2" 80 via one of the PE routers (e.g., PE1 16) in the event that the other protected Provider Edge (pPE) router (e.g., PE0 12) is not available.

Consequently, the data packet can be rerouted before BGP reconvergence among the edge routers, without the risk of the rerouted data packet encountering loops. Moreover, the use of segment identifiers according to segment routing eliminates the necessity of hop-by-hop signaling techniques.

Hence, the example embodiments ensure that no router needs to copy prefixes from another router, such that only the edge router needs to store its own label for reaching the next-hop destination network, i.e., only the protected Provider Edge (pPE) router 12 and the repair PE router 16 need to store their own labels for reaching the next-hop destination network 24. Further, the BGP-free core network router 18 is not required to learn any BGP prefix, nor is the BGP-free core network router 18 required to undergo any complicated provisioning efforts; hence, the size of the forwarding and routing tables in any core router 18 is independent of the number of BGP prefixes in use by the edge routers 12, 14, 16.

Further, the choice of a primary path 32 using the segment identifier of the protected PE router 12 or a backup path 34 using the segment identifier of the backup PE router 16 is chosen solely by the ingress Provider Edge (iPE) router 14 according to its internal policies, and is therefore independent of the advertisements by the other routers 12 or 16. Further, the example embodiments ensure that the segment identifier for the backup path 34 is specified in each data packet, enabling any BGP-free core network router (rP) in the core network 22 to independently reroute the received data packet to the repairing PE router (rPE) if the protected PE router (pPE) is unavailable.

Each of the routers 12, 14, 16, 18, and 20 can be referred to also as "apparatus". In particular, each router (apparatus) 12, 14, 16, 18 and 20 is a physical machine (i.e., a hardware device) configured for implementing network communications with other physical machines (e.g., customer edge (CE) routers 20) via the network 10. Hence, each apparatus 12, 14, 16, 18, and 20 is a network-enabled machine implementing network communications via the network 10.

Figure 2:
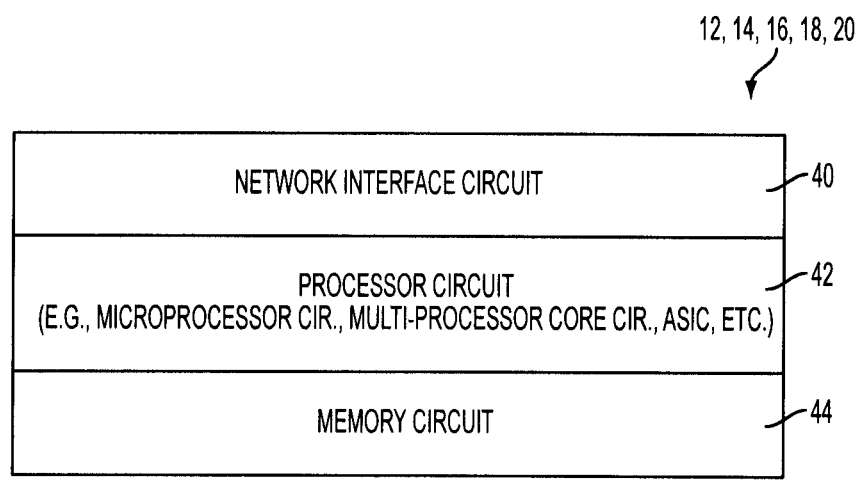
FIG. 2 illustrates an example implementation of any one of the routers of FIG. 1, according to an example embodiment.

FIG. 2 illustrates an example implementation of any one of the routers 12, 14, 16, 18, or 20 of FIG. 1, according to an example embodiment. Each of the routers 12, 14, 16, 18, or 20 can include one or more network interface circuits 40, one or more processor circuits 42, and one or more memory circuits 44.

Any of the disclosed circuits of the routers 12, 14, 16, 18, or 20 (including the network interface circuit 40, the processor circuit 42, and the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3:
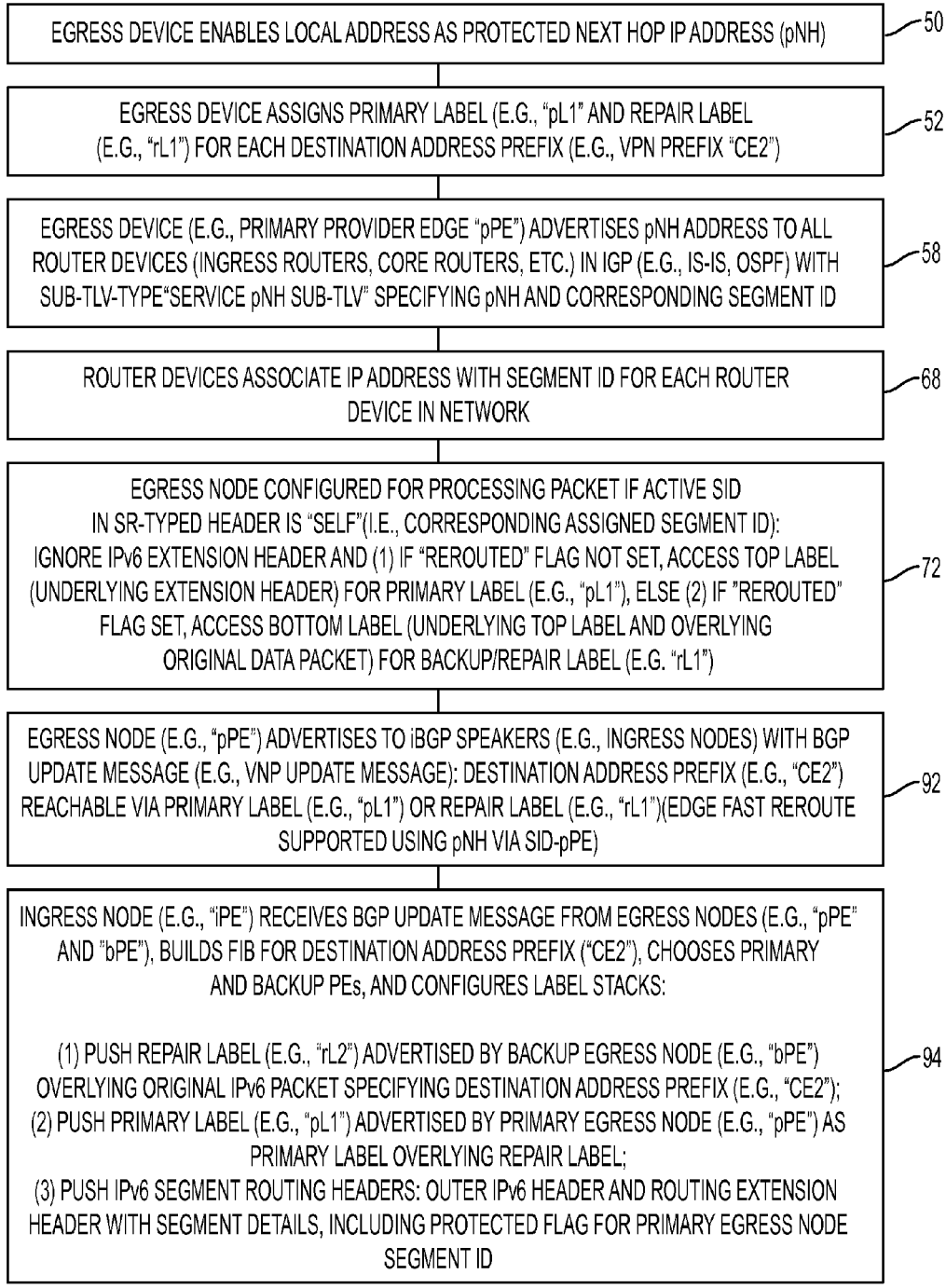
FIG. 3 illustrates a method of an egress node sending advertisements for enabling an ingress node to insert labels and an IPv6 extension header for fast rerouting of a data packet if a provider edge router is unavailable, according to an example embodiment.

FIG. 3 illustrates a method of an egress node sending advertisements for enabling an ingress node to insert labels and an IPv6 extension header for fast rerouting of a data packet if a provider edge router is unavailable, according to an example embodiment. The operations described herein with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media (e.g., programmable logic arrays or devices, field programmable gate arrays, programmable array logic, application specific integrated circuits, etc.) for execution by a machine.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

FIG. 3 illustrates a method in the network 10 of enabling an ingress provider edge router 14 to insert egress router labels and SR-typed IPv6 headers, for fast rerouting to a destination "CE2" 20, according to an example embodiment. In particular, FIG. 3 illustrates operations that enable any BGP-free core network router 18 to reroute a received data packet (70 of FIG. 7) to the backup provider edge router 16 based on the core network router 18 detecting that the protected PE router 12 is unavailable via the primary path 32.

The processor circuit 42 of an egress device (12, 16) can enable a local address as a protected next-hop IP address in operation 50. For example, the egress device "PE0" 12 can enable the address "1.1.1.2" (also identified herein by the label "pNH") 28 as the protected next-hop IP address for a corresponding destination address prefix (e.g., "10.0.0.0/8") 26, and the egress device "PE1" 16 can enable the address "9.9.9.2" (also identified herein by the label "bNH") 30 as the protected next-hop IP address for the corresponding destination address prefix (e.g., "10.0.0.0/8") 26. The processor circuit 42 in each egress device 12, 16 in operation 52 can assign a primary label 54 and a backup label 56, illustrated in FIG. 5, for each destination address prefix 26, illustrated for example as the destination "CE2" 20. For example, the egress device 12 can assign a primary label "pL1" 54 and a backup label (i.e., repair label) "rL1" 56 for the destination address prefix "10.0.0.0/8" 26 reachable via the destination customer edge router "CE2" 20. As described below, the labels are advertised to the ingress provider edge routers 14 to enable insertion into a data packet.

Figure 4:
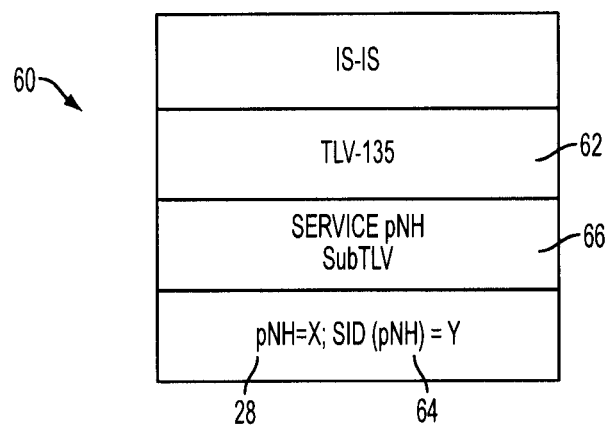
FIG. 4 illustrates an example link state message output by an egress node according to an example embodiment.

The processor circuit 42 of each egress device 12 and 16 in operation 58 also can advertise protected next-hop address to all the router devices 12, 14, 16, and 18 within an interior gateway protocol (IGP) advertisement message 60, illustrated in FIG. 4. The IGP advertisement message 60 can be a link state data packet (e.g., IS-IS or OSPF) that can include a type-length-value (TLV) element 62 identifying an extended service option: for example, the TLV element 62 can identify an "extended IP reachability" within an IS-IS data packet (TLV-135). The IGP advertisement message 60 also can specify the protected next hop address (e.g., 28 for PE0), and a corresponding segment identifier 64 that specifies the segment ID used to reach the protected next hop address specified in the advertisement message 60. The advertisement message 60 also can specify semantics 66 as part of the extended service option 62, for example that backup information can be supplied in an SR-typed extension header identified as having "Routing Type" value of "1" within the Routing Type field (as described, for example, in Request for Comments (RFC) 2460).

Hence, flooding of the advertisement message 60 by the network interface circuit 40 of the egress device (12, 16) enables any router device (e.g., any ingress PE 14, any core router 18, etc.) to associate in operation 68 of FIG. 3 the protected next hop address 28 with the segment identifier 64 for use in Segment Routing, for example based on adding the segment identifier 64 to a segment forwarding information base (SFIB) table in the corresponding memory circuit 44 of the router device. Alternately, the segment identifiers for each of the provider edge routers 12, 14, and/or 16 can be distributed by a centralized network controller associated with the core network 22, for example a software defined networking (SDN) controller. The segment identifiers 64 also can be calculated dynamically based on the known parameters for the segment identifiers 64 according to segment routing.

As illustrated in further detail below with respect to FIG. 7, an ingress PE 14 can implement scalable edge node protection using IPv6 segment routing extension headers based on adding to a received data packet (82 of FIG. 7) a primary label (e.g., 54*a*) for use by a primary PE router (e.g., "PE0") 12 for reaching destination "CE2" 20, a repair label (e.g., 56*b*) for use by a backup PE router 16 for reaching the destination "CE2" 20 (if the primary PE router 12 is unavailable), and encapsulated by a SR-typed IPv6 outer header 74 and an SR-typed extension header 76 containing header fields 78 (described below) and a list 80 of segment identifiers 64 having respective rerouting flag groups 84. The ingress PE can output the protected IPv6 packet 70 into the core network 22 for delivery to the destination "CE2" via either the primary PE 12 or the backup PE 16.

An SR-typed IPv6 outer header 74 is an IPv6 header that is "typed" for identifying that IPv6 based Segment Routing is to be performed. In particular, an SR-typed IPv6 outer header can include IPv6 fields such as a 4-bit "version" field identifying IPv6, a traffic class field, a flow label field, a next header field (specifying a value of "43" for identifying the SR-typed extension header 76 as a routing header), a hop limit field, a 128-bit source address field identifying the IPv6 address of the ingress PE node 14 that generated the protected IPv6 packet 70, and a 128-bit destination address field.

In contrast to carrying a 128-bit IP address as in conventional IPv6 protocol, the 128-bit destination address field in the SR-typed outer IPv6 header 74 can contain a 128-bit SR-typed address "block" that can contain a prescribed segment routing identifier field (e.g., 64 bits) (not shown), an "Active SID" 90 field identifying the currently active segment ID 64 that is being used to route the data packet 70 to the next destination, and a flag field 84' associated with the active segment ID 64 identified in the "Active SID" field. Other fields also may be present in the destination address field in the SR-typed outer IPv6 header 74. The prescribed segment routing identifier in the destination address field in the SR-typed outer IPv6 header 74 identifies that segment routing is to be performed using the currently active segment ID 64 in the "Active SID" field 90; the "flag" field 84' in the destination address field can include the associated rerouting flag group 84 for the currently active segment ID 64 "Active SID".

The header fields 78 of the SR-typed extension header 76 can include a "Routing Type" header having a distinct value (e.g., "Routing Type=1") for identifying the routing extension header 76 as providing a list 80 of segment identifiers 64 and associated flag sets 84. The header fields 78 also can include a next header field (specifying a value of "41" for identifying the encapsulated packet 82 in accordance with RFC 2473), the IPv6 address of the source ingress PE 14, the IPv6 protected next hop address 28 of the protected PE 12, and a pointer field identifying the active segment identifier 64 from the list 80. Hence, the SR-typed extension header 76 is analogous to a source routing header, in that the list 80 of segment identifiers 64*a*, 64*b*, and 64*c* can be accessed in sequence as the data packet 70 traverses the core network 22, with the pointer field updated accordingly as the "Active ID" field 90 is updated; hence the "Active ID" field 90 in the destination address field of the outer header 74 can initially be set by the ingress PE 14 with the initial segment ID "SID1" 64*a* (and the corresponding flag group 84 copied into the flag field 84'); as the data packet 70 is propagated toward the egress PE 12 via the sequence of segment identifiers 64*a*, 64*b*, and 64*c*, the pointer field and the "Active ID" field 90 (and flag field 84') can be updated with the currently active segment identifier 64.

As described below, a router 18, 28 receiving the data packet 70 can detect the use of segment routing from the prescribed segment routing identifier field, and in response retrieve the active segment ID from the "Active SID" field 90 to search for a corresponding table entry in its local a segment forwarding information base (SFIB) table to execute the appropriate forwarding decision. For example, an intermediate router 18 may include an SFIB table entry to update the Active SID field 90 with the next segment ID 64 based on the pointer field in the header field 78, and output the data packet 70 on a prescribed egress port of its network interface circuit 40.

The flag group 84 associated with a segment identifier 64 in the list 80 of segment identifiers can include a protected flag "P" 86: the protected flag "P" if set indicates that the corresponding segment identifier (e.g., 64c) is protected, i.e., that a segment identifier (64d) for a backup PE is positioned underlying the corresponding protected segment identifier (64c) in the list 80; hence, if the segment identifier 64c for the protected PE 12 is copied into the "Active SID" field 90 in the destination address field of the outer header 74, the corresponding flag group 84 for the segment identifier 64c is copied into the flag field 84' in the destination address field of the outer header 74 to identify that the "Active SID" is protected by a segment identifier (e.g., 64d) of a backup PE 16. A rerouted flag "R" 88 is kept cleared (i.e., R=0) and is only set in the flag field 84' in response to a rerouting operation, described below.

Hence, any core router 18 can determine from the flag field 84' in the destination address field of the outer header 74 whether the corresponding segment identifier 64 in the "Active SID" field 90 is protected based on the corresponding protected flag 86' being set ("P=1").

Referring to FIG. 3, each egress node 12, 16 in operation 72 can create an SFIB entry for receiving an IPv6 data packet having an SR-typed IPv6 header (74 of FIG. 7) destined for itself. In particular, if an egress node (e.g., "pPE" 12) detects its corresponding segment identifier e.g., ("pPE-SID") 64 in the "Active ID" field 90, the egress node can configure itself by creating a corresponding SFIB entry specifying semantics to ignore the IPv6 extension header 76; further the semantics can specify that if the rerouted flag 88 is not set (R=0), the processor circuit 42 of the egress router then can access the top label 54 as an application label (e.g., a VPN label) underlying the extension header 76 for the primary label (e.g., "pL1") 54, and ignore the bottom label 56 as "reserved"; the semantics also can specify that if the rerouted flag 88 is set (R=1), the processor circuit 42 of the egress router then can access the bottom label 56 underlying the top label 54 (ignored as "reserved") for retrieval of the backup/repair label (e.g., "rL1") 56 as an application label (e.g., a VPN label). Hence, the egress node 12, 16 can create a corresponding SFIB entry to specify semantics on retrieving, as an application label (e.g., a VPN label), either the primary label (e.g., "pL1") 54 if the rerouted flag 88 is not set (R=0), or the repair label (e.g., "rL1") 56 if the rerouted flag 88 is set (R=1).

Figure 5:
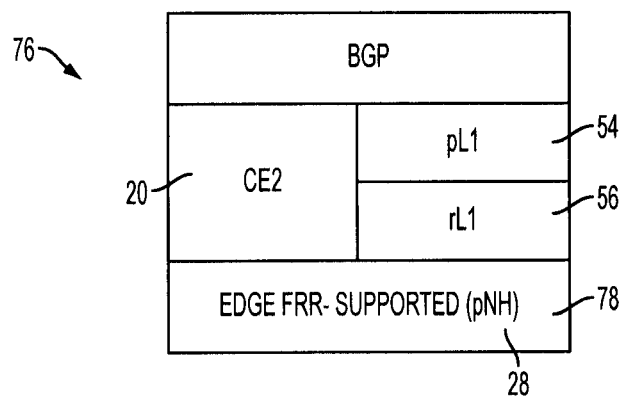
FIG. 5 illustrates an example BGP update message output by an egress node according to an example embodiment.

The processor circuit 42 of the egress node (e.g., 12) generates in operation 92 a BGP advertisement message 76, illustrated in FIG. 5. The BGP advertisement message 76, implemented for example as a BGP update message (e.g., a VPN update message) is output and sent by the network interface circuit 40 of the egress router 12 to the internal BGP (iBGP) peers, or iBGP "speakers" such as the ingress nodes 14. As illustrated in FIG. 5, the BGP advertisement message 76 generated by the processor circuit 42 identifies the destination "CE2" 20 is reachable via the primary label "pL1" 54, also referred to as the "application label" or "VPN label". The BGP advertisement message 76 also specifies repair information in the form of the repair label 56 and a new BGP attribute field 78 indicating that edge fast rerouting is supported using the protected next hop address 28. Hence, the BGP advertisement message 76 can be sent as part of a BGP VPN update message.

The processor circuit 42 of an ingress edge node 14 in operation 94 can create in its corresponding memory circuit 44 a segment forwarding information base (SFIB) entry in response to the corresponding network interface circuit 40 receiving the BGP advertisement message 76 from the egress provider edge device 12 via the core network 22. The segment forwarding information base table entry can specify that the destination address prefix "CE2" 20 is reachable via the protected next hop address (pNH) 28 of the egress router "PE0" 12, using either the primary label "pL1" 54 (if egress router "PE0" is the primary router for reaching the destination) or the backup label "rL1" 56 (if the egress router "PE0" is to be the backup router for reaching the destination if another primary router is unavailable to reach the destination). The ingress provider edge router 14 also can receive a corresponding advertisement 60 (described above with respect to operations 58 and 68) that enables the ingress provider edge router 14 to associate the protected next hop address (pNH) 28 of the provider edge router "PE1" 16 with the corresponding segment identifier "pPE-SID" 64 for segment routing.

The ingress provider edge router 14 also can receive in operation 94 a second advertisement message 76 from the provider edge router "PE1" 16 specifying the destination address prefix "CE2" 20 is reachable by the protected next hop address (bNH) 30 using either a primary label (e.g., "pL2") 54 or a backup label (e.g., "rL2") 56. The ingress provider edge router 14 also can receive a corresponding advertisement 60 (described above with respect to operations 58 and 68) that enables the ingress provider edge router 14 to associate the protected next hop address (bNH) 30 of the provider edge router "PE1" 16 with the corresponding segment identifier "bPE-SID" 64d for segment routing.

Hence, the processor circuit 42 of the ingress provider edge router 14, in response to receiving the BGP update messages 76 from the provider edge routers 12 and 16, can add into the SFIB entry that the destination "CE2" is reachable via the protected next hop address "pNH" 28 (using the primary label "pL1" 54 or backup label "rL1" 56) using the corresponding segment identifier "pPE-SID" 64c, or reachable via the protected next hop address "bNH" 30 (using the primary label "pL2" 54 or backup label "rL2" 56) using the corresponding segment identifier "bPE-SID" 64d. The processor circuit 42 of the ingress provider edge router 14 also can select one of the provider edge routers 12 or 16 as a primary router for reaching the destination "CE2" 20: assuming the processor circuit 42 of the ingress provider edge router 14 selects the provider edge router "PE0" 12 as the primary router for reaching the destination "CE2" 12, the processor circuit 42 of the ingress provider edge router 14 also can select the other provider edge router "PE1" as a backup router for reaching the destination "CE2" 20.

As illustrated with respect to FIG. 3, the processor circuit 42 of the ingress provider edge router 14 in operation 94 can configure its forwarding table entries to specify that a received data packet (e.g., from a customer premises router "CE1" 20) 82 should be processed by inserting (i.e., pushing) labels in a prescribed sequence, for example pushing the repair label "rL2" 56b of the backup PE router "bPE" 16 as the bottom label overlying the received data packet 82, pushing the primary label "pL1" 54a of the primary PE router "pPE" 12 overlying the repair label "rL2" 56b, and encapsulating the packet with IPv6 segment routing headers, namely the outer IPv6 header 74 and the routing extension header 76 including the headers 78, and the list 80 of the sequence of segment identifiers 64 and respective flag group 84.

Figure 6A:
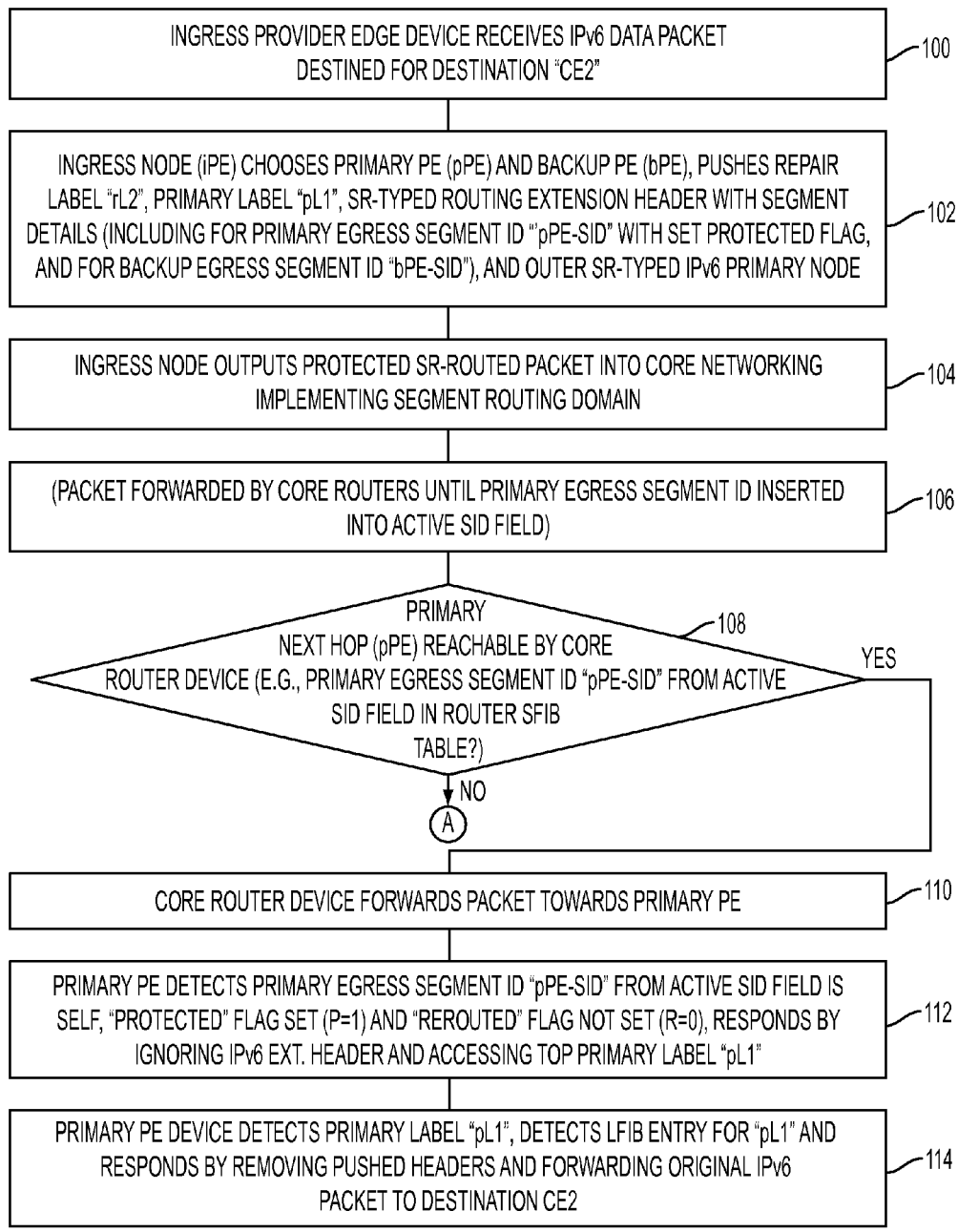
FIGS. 6A and 6B illustrates an example method of generating and forwarding of a data packet by the ingress node, core router, and available egress node of FIG. 1, according to an example embodiment.
Figure 6B:
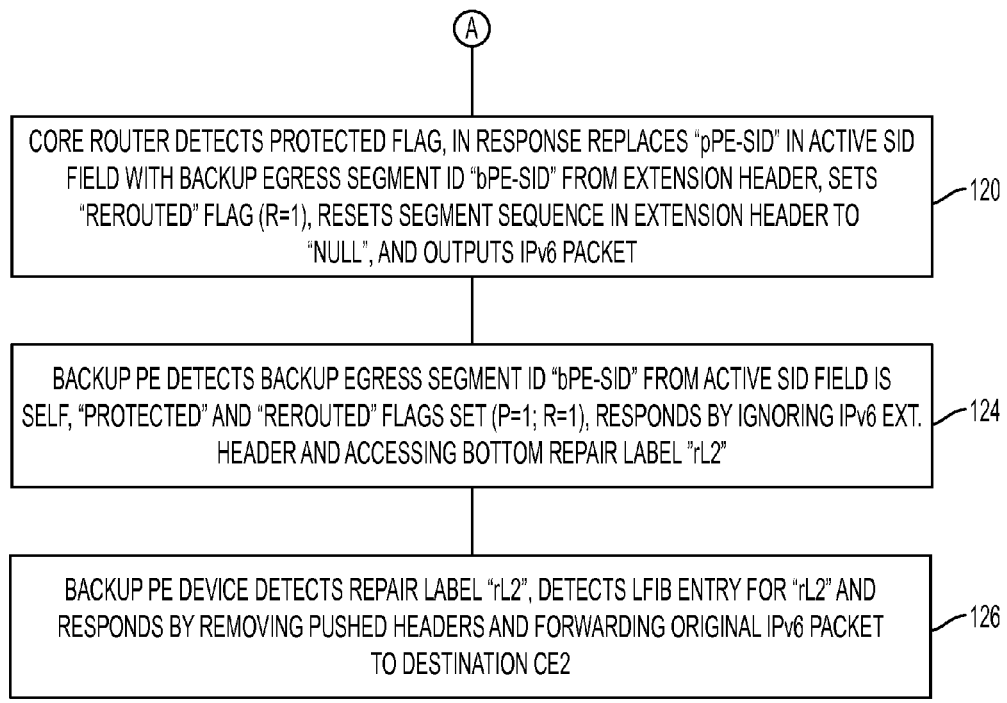

FIGS. 6A and 6B illustrate an example method of forwarding an IPv6 data packet 70 via the core network 22 based on pushing labels 54, and 56 overlying a received data packet 82, and encapsulating with SR-typed routing headers 74, 76, according to an example embodiment.

The ingress provider edge device 14 receives in operation 90 a data packet 82 from a local consumer edge router (e.g., "CE1" 20) that is destined for an identified destination "CE2" 20. In response to accessing its segment forwarding information base (SFIB) table entry for the destination address 20 from its memory circuit 44, the processor circuit 42 of the ingress provider edge device 14 can choose in operation 102 its primary provider edge router (e.g., "pPE") 12 and backup provider edge router (e.g., "bPE") 16, and push the labels as described previously with respect to operation 94, namely push the repair label "rL2" 56b as an application label in the IPv6 packet 70, the primary label "pL1" 54a as an application label in the IPv6 packet 80, and encapsulate with the SR-typed IPv6 outer header 74 and the SR-typed extension header 76, including the sequence 80 of segment identifiers 64. As illustrated in FIG. 7, the ingress PE device 14 can add the sequence of segment identifiers "SID1" 64a, "SID2" 64b, and "pPE-SID" 64c for reaching the pPE router 12, where the segment identifiers 64a and 64b can represent other segments identified as providing optimized reachability toward the penultimate segment "pPE-SID" 64c. Alternately, the sequence 80 of segment identifiers can start with the segment identifier 64c for the pPE router if no other antecedent segment identifiers are needed.

The network interface circuit 40 can output in operation 104 the IPv6 data packet 70 into the core network 22 using the initial segment identifier 64a in the "Active SID" field 90. The data packet 70 is forwarded in operation 106 via other routers (not shown) in the core network, that can successively update the "Active SID" field 90 (and corresponding flag field 84') and the pointer field in the headers 78 with the next segment identifier (e.g., 64b) as the data packet 70 traverses the core network 22, until the segment identifier 64c of the protected PE 12 and corresponding flag group 84 is copied to the "Active SID" field 90 and the flag field 84, respectively.

Figure 7:
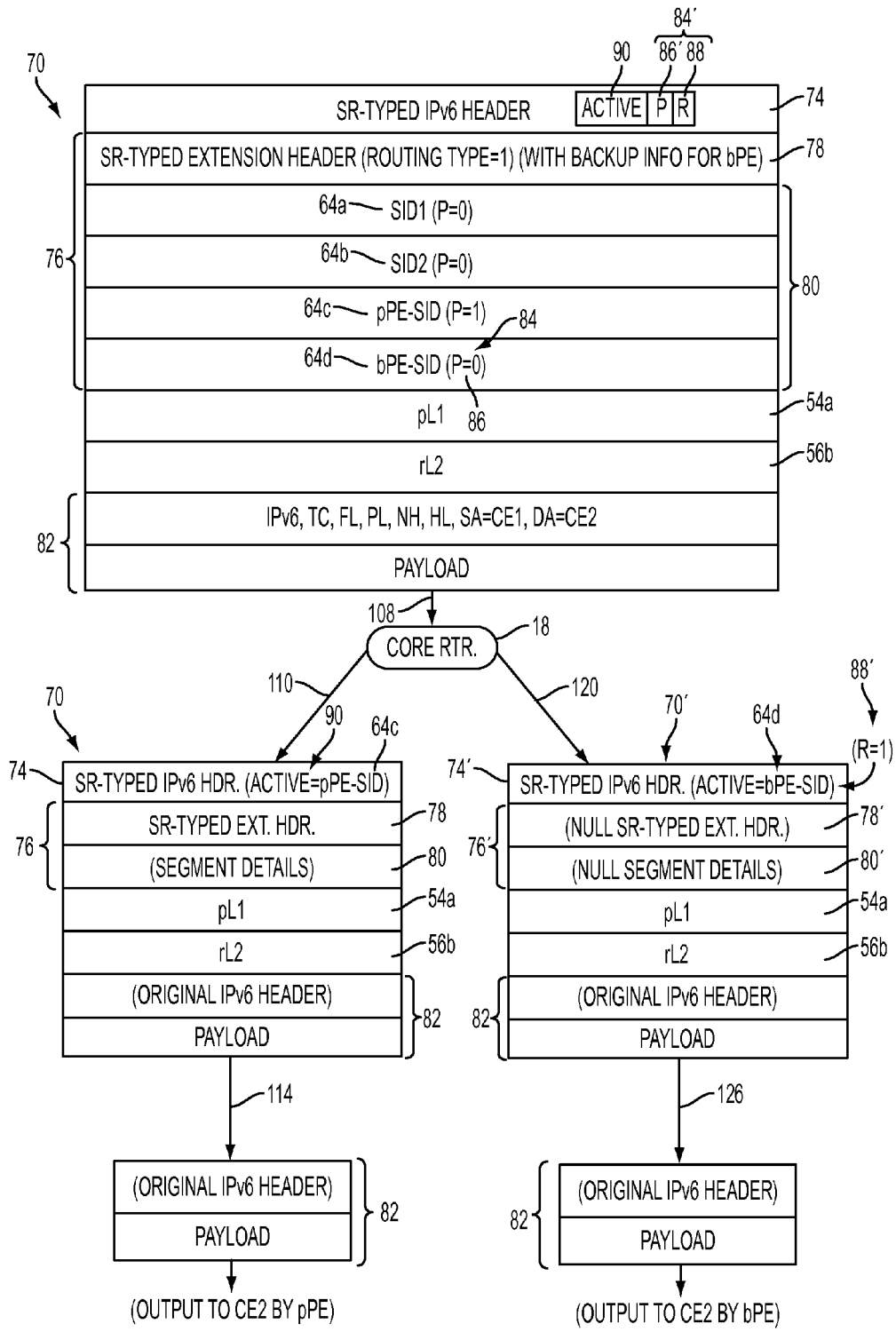
FIG. 7 illustrates another example of labels and IPv6 headers inserted into a data packet during transmission via the core network of FIG. 1, according to an example embodiment.

As illustrated in FIG. 7, the protected flag 86 for the segment identifier "pPE-SID" 64c of the protected PE 12 initially is set (P=1) by the processor circuit 42 of the ingress PE 14 to indicate to any core router 18 in the core network 22 that the segment identifier 64c is a "protected segment identifier" that has a backup segment identifier (64d) to a corresponding backup PE 16 if the protected segment identifier is not available (i.e., not reachable via the core network 22). Hence, copying the protected segment identifier "pPE-SID" 64c to the "Active SID" field 90 causes the corresponding set protected flag ("P=1") 86 to be copied as an active protected flag 86' in the destination address field of the outer IPv6 header 74.

In response to the network interface circuit 40 of any core router (e.g., the penultimate hop (PHP) device) 18 receiving in operation 108 the data packet 70 specifying the protected segment identifier "pPE-SID" 64c in the "Active SID" field 90, the processor circuit 42 of the core router 18 determines whether the corresponding pPE router 12 is reachable (e.g., whether the primary egress segment identifier "pPE-SID" 64c is in the corresponding SFIB table). If the processor circuit 42 of the core router 18 determines the protected segment identifier "pPE-SID" 64c in the "Active SID" field 90 is available, the core router 18 forwards in operation 110 the data packet 70 without any changes toward the primary PE router 12.

In response to the network interface circuit 40 of the primary provider edge router 12 receiving the data packet in operation 112, the processor circuit 42 parses the "Active ID" field 90 to determine the active segment identifier 64: in response to the processor circuit 42 of the primary provider edge router 12 detecting the "Active ID" field 90 contains its associated segment identifier "pPE-SID" 64c (e.g., by accessing the corresponding SFIB entry for the active segment identifier "pPE-SID" 64c), the processor circuit 42 executes the operations as configured in operation 72, namely detecting that the "rerouted" flag 88 is not set (R=0), ignoring the IPv6 extension header 76, and obtaining the top primary label "pL1" 54a which can be interpreted as an "application label" (e.g., VPN label) in the IPv6 packet 70 (the label "rL2" can be ignored as a "reserved label"). In response to detecting the primary label "pL1" 54a in operation 114, the processor circuit 42 can access the corresponding table entry in its label forwarding information base (LFIB) and respond by removing the pushed IPv6 headers 74 and 76, removing the labels 54a and 56b, and outputting the original data packet 82 to the destination "CE2" 20.

If in operation 108 of FIG. 6A the processor circuit 42 of the core router device 18 determines from the received data packet 70 that the pPE router 12 (identified by its corresponding segment identifier "pPE-SID" 64c in the "Active ID" field 90) is not reachable, the processor circuit 42 of the core router device 18 determines in operation 120 of FIG. 6B whether the corresponding protected flag 86' is set: if the protected flag 86' is not set, the data packet 70 is dropped. In response to detecting the protected flag 86' is set (P=1), the processor circuit 42 of the core router device 18 can execute fast rerouting based on retrieving, from the list 80, the backup segment identifier "bPE-SID" 64d under the active segment identifier "pPE-SID" 64c (based on the pointer in the header fields 78). The processor circuit 42 of the core router device 18 in operation 120 can insert the segment identifier "bPE-SID" 64d for the backup PE 16 into the "Active SID" field 90, set the rerouted flag 88 (R=1), and optionally clear the segment sequence 80 in the extension header 76 to "null", resulting in the null fields 78' and 80' in the modified IPv6 data packet 70'. The modified IPv6 data packet 70' is output by the device interface circuit 40 of the core router device 18 in operation 122 of FIG. 7 for delivery to the backup PE 16 based on the corresponding backup segment identifier "bPE-SID" 64d.

In response to the network interface circuit 40 of the backup PE device 16 receiving the modified IPv6 data packet 70', the corresponding processor circuit 42 of the backup PE device 16 in operation 124 can detect the backup segment identifier "bPE-SID" 64d from the "Active SID" field 90 in operation 124, and detect from its local SFID table that the backup segment identifier "bPE-SID" 64d is owned by the backup PE device 16. In response, the processor circuit 42 of the backup PE device 16 can execute the semantics specified in the SFID table entry for the backup segment identifier "bPE-SID" 64d as described above with respect to operation 62. For example, the processor circuit 42 can detect the protected flag 86' is set (P=1), and that the rerouted flag 88' is set (R=1). In response to detecting the rerouted flag 88' is set, the processor circuit 42 of the backup PE device 16 can access the repair label "rL2" 56b which can be interpreted as an "application label" (e.g., VPN label) in the IPv6 packet 70' while ignoring the label "pL1" 54a as a "reserved label", access the corresponding LFIB entry from its LFIB table, and respond by removing in operation 126 the IPv6 headers 74' and 76', removing the labels 54a and 54b, and outputting the original data packet 82 to the destination "CE2" 20.

According to the example embodiments, an egress node can advertise its protected next hop address with all the associated detected VPN prefixes 26 along with existing BGP update messages, and can advertise its protected next hop address as a new sub-TLV in link state advertisement message. Further, use of a protected/backup flag in an SR-typed IPv6 header enables any core router to execute fast rerouting based on accessing a backup segment identifier from an SR-typed extension header. Hence, no additional addresses need to be advertised in the IGP core by egress nodes or by core nodes 18. Further, the example embodiments can implement fast reroute protection without hop by hop configuration schemes such as label distribution protocol.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    generating, by a first provider edge router associated with a first segment identifier, a primary label identifying the first provider edge router as a primary egress router for reaching a destination, and a repair label identifying the first provider edge router as a backup egress router for reaching the destination if a second provider edge router associated with a second segment identifier is unavailable to reach the destination;
    advertising in a core network, by the first provider edge router, the first segment identifier for reaching the first provider edge router in the core network; and
    sending via the core network, by the first provider edge router, an advertisement specifying the primary and repair labels, enabling an ingress provider edge router to insert, into an IPv6 data packet, selected primary and repair labels from the first and second provider edge routers and a segment routing-typed IPv6 extension header specifying the first and second segment identifiers and a protected flag, for fast rerouting by a core router in the core network to the destination via one of the first or second provider edge router if the other is unavailable, wherein the first and second segment identifiers enable segment routing of the IPv6 data packet by the ingress provider edge router and the core router in the core network without hop-by-hop signaling.

2. The method of claim 1, further comprising the first provider edge router allocating a first protected next-hop address associated with the first segment identifier for protected reachability to the destination, the advertising of the first segment identifier including sending a link state advertisement associating the first protected next-hop address with the first segment identifier.

3. The method of claim 1, wherein the advertising of the first segment identifier and the advertisement further enables the ingress provider edge router to insert, into the IPv6 data packet, the corresponding repair label of the one provider edge router and the primary label for the other provider edge router.

4. The method of claim 1, wherein the protected flag enables any core router in the core network to detect the corresponding segment identifier of the one provider edge router in the extension header for fast rerouting if the other provider edge router is unavailable.

5. The method of claim 1, further comprising:
    the first provider edge router receiving the IPv6 data packet from the ingress provider edge router via the core network;
    the first provider edge router accessing one of the primary label or the repair label based on whether a rerouted flag in the IPv6 data packet has been set in the core network indicating fast rerouting has been performed; and
    forwarding a data packet contained in the IPv6 data packet, without the primary repair labels or the IPv6 extension header, to the destination based on the accessed one label.

6. A method comprising:
    selecting, by an ingress provider edge router, one of first or second provider edge routers as a primary router for reaching a destination via a core network, and selecting the other of the first or second provider edge routers as a backup router for reaching the destination via the core network; and
    inserting, into an IPv6 data packet destined for the destination, a primary label assigned by the primary router and a repair label assigned by the backup router, and an IPv6 extension header specifying first and second segment identifiers associated with the respective first and second provider edge routers and a protected flag that enables fast rerouting, by a core router in the core network, of the IPv6 data packet to the backup router if the primary router is unavailable;
    wherein the protected flag is associated with the corresponding segment identifier of the primary router, the inserting further including inserting a null rerouted flag that enables any router to specify that the IPv6 data packet is being rerouted to the backup router.

7. The method of claim 6, wherein the inserting includes inserting a sequence of segment identifiers for reaching the primary router via the core network, the protected flag associated with the corresponding segment identifier of the primary router to identify the corresponding segment identifier of the backup router if the primary router is unavailable.

8. The method of claim 6, wherein the protected flag enables any core router in the core network to detect the corresponding segment identifier of the backup router if the primary router is unavailable.

9. Logic encoded in one or more non-transitory tangible media for execution by a machine and when executed by the machine operable for:
    generating, by a first provider edge router associated with a first segment identifier, a primary label identifying the first provider edge router as a primary egress router for reaching a destination, and a repair label identifying the first provider edge router as a backup egress router for reaching the destination if a second provider edge router associated with a second segment identifier is unavailable to reach the destination;
    advertising in a core network, by the first provider edge router, the first segment identifier for reaching the first provider edge router in the core network; and
    sending via the core network, by the first provider edge router, an advertisement specifying the primary and repair labels, enabling an ingress provider edge router to insert, into an IPv6 data packet, selected primary and repair labels from the first and second provider edge routers and a segment routing-typed IPv6 extension header specifying the first and second segment identifiers and a protected flag, for fast rerouting by a core router in the core network to the destination via one of the first or second provider edge router if the other is unavailable, wherein the first and second segment identifiers enable segment routing of the IPv6 data packet by the ingress provider edge router and the core router in the core network without hop-by-hop signaling.

10. The logic of claim 9, further operable for the first provider edge router allocating a first protected next-hop address associated with the first segment identifier for protected reachability to the destination, the advertising of the first segment identifier including sending a link state advertisement associating the first protected next-hop address with the first segment identifier.

11. The logic of claim 9, wherein the advertising of the first segment identifier and the advertisement further enables the ingress provider edge router to insert, into the IPv6 data packet, the corresponding repair label of the one provider edge router and the primary label for the other provider edge router.

12. The logic of claim 9, wherein the protected flag enables any router in the core network to detect the corresponding segment identifier of the one provider edge router in the extension header for fast rerouting if the other provider edge router is unavailable.

13. The logic of claim 9, further operable for:
the first provider edge router receiving the IPv6 data packet from the ingress provider edge router via the core network;
the first provider edge router accessing one of the primary label or the repair label based on whether a rerouted flag in the IPv6 data packet has been set in the core network indicating fast rerouting has been performed; and
forwarding a data packet contained in the IPv6 data packet, without the primary repair labels or the IPv6 extension header, to the destination based on the accessed one label.

14. Logic encoded in one or more non-transitory tangible media for execution by a machine and when executed by the machine operable for:
selecting, by an ingress provider edge router, one of first or second provider edge routers as a primary router for reaching a destination via a core network, and selecting the other of the first or second provider edge routers as a backup router for reaching the destination via the core network; and
inserting, into an IPv6 data packet destined for the destination, a primary label assigned by the primary router and a repair label assigned by backup router, and an IPv6 extension header specifying first and second segment identifiers associated with the respective first and second provider edge routers and a protected flag that enables fast rerouting, by a core router in the core network, of the IPv6 data packet to the backup router if the primary router is unavailable;
wherein the protected flag is associated with the corresponding segment identifier of the primary router, the inserting further including inserting a null rerouted flag that enables any router to specify that the IPv6 data packet is being rerouted to the backup router.

15. The logic of claim 14, wherein the inserting includes inserting a sequence of segment identifiers for reaching the primary router via the core network, the protected flag associated with the corresponding segment identifier of the primary router to identify the corresponding segment identifier of the backup router if the primary router is unavailable.

16. The logic of claim 14, wherein the protected flag enables any core router in the core network to detect the corresponding segment identifier of the backup router if the primary router is unavailable.

17. A method comprising:
receiving, by a core router in a core network, an IPv6 data packet generated by an ingress provider edge router and destined for a destination via a primary egress router, the IPv6 data packet having a segment routing-typed IPv6 extension header specifying a segment identifier for the primary egress router and a backup flag for fast rerouting of the IPv6 data packet to the destination via a backup egress router if the primary egress router is unavailable; and
fast rerouting, by the core router, the IPv6 data packet to the backup egress router in response to determining the primary egress router is unavailable and detecting the backup flag, the fast rerouting including obtaining the corresponding segment identifier for the backup egress router from the segment routing-typed IPv6 extension header, inserting the segment identifier for the backup egress router into a destination address field of an outer IPv6 header of the IPv6 data packet, and outputting the IPv6 data packet toward the backup egress router.

18. The method of claim 17, further comprising setting a rerouted flag in the destination address field indicating the IPv6 data packet has been rerouted due to the unavailability of the primary egress router.

19. The method of claim 1, wherein the advertisement enables the ingress provider edge router to insert, into the IPv6 data packet, a protected flag associated with the corresponding segment identifier of the provider edge router associated with the primary label, and a null rerouted flag that enables any router to specify that the IPv6 data packet is being rerouted to the provider edge router associated with the backup label.

20. The apparatus of claim 9, wherein the advertisement enables the ingress provider edge router to insert, into the IPv6 data packet, a protected flag associated with the corresponding segment identifier of the provider edge router associated with the primary label, and a null rerouted flag that enables any router to specify that the IPv6 data packet is being rerouted to the provider edge router associated with the backup label.

* * * * *